(No Model.)
C. SCHNELL.
APPARATUS FOR THE MANUFACTURE OF RE-PRESSED CEMENT PIPES.
No. 500,675. Patented July 4, 1893.
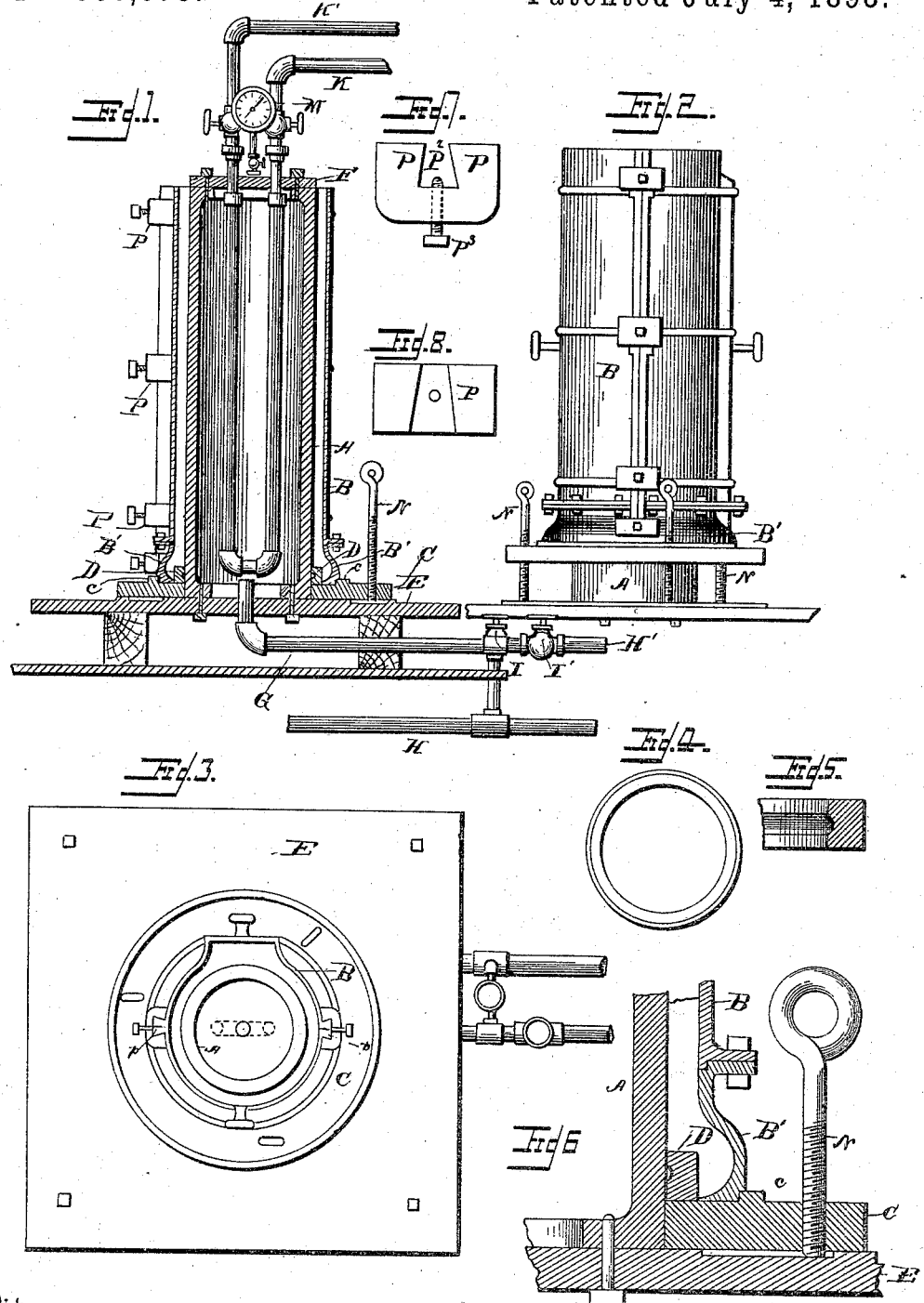

UNITED STATES PATENT OFFICE.

CLEMENS SCHNELL, OF PATERSON, NEW JERSEY.

APPARATUS FOR THE MANUFACTURE OF RE-PRESSED CEMENT PIPES.

SPECIFICATION forming part of Letters Patent No. 500,675, dated July 4, 1893.

Application filed January 23, 1892. Serial No. 419,060. (No model.)

*To all whom it may concern:*

Be it known that I, CLEMENS SCHNELL, of Paterson, in the county of Passaic and State of New Jersey, have invented a certain new and useful Method of Manufacturing Re-Pressed Pipes and Similar Hollow Articles of Cement or Plastic Material; and I do hereby declare the following to be a full, clear, and exact description of the same, reference being had to the accompanying drawings, forming a part of this specification, and to the letters of reference marked thereon.

The object of the present invention is to improve the process employed in the manufacture of pipe and hollow ware from cement or plastic material, whereby the time required in the manufacture is shortened, the cost of plant reduced and the articles made more uniform and perfect.

In the manufacture of pipe, &c., as heretofore practiced, molds for giving the proper shape to both the inside and outside were employed, and after the cement had been placed therein it had to remain for a day, more or less, depending upon the temperature of the mold and surrounding atmosphere. Thus in carrying on the manufacture it was necessary to have a large number of molds on hand, vastly increasing the cost, besides taking up much valuable floor space. It has been common to employ both wooden and cast iron molds, but the cores had of necessity to be made larger at the bottom than at the top to facilitate removal of the dried pipe and consequently, the pipe was imperfect to this extent. In carrying my present invention into practice I design to overcome these defects and difficulties and not only enable the pipe to be made of uniform internal diameter but permit of its removal from the core in a very short time.

The invention consists primarily in expanding the core by heat when the cement or plastic material has been inserted to press and compact the same, then contracting the core by reducing the temperature whereby the diameter is reduced and the pipe may be easily removed.

The invention further consists in certain novel details of construction and combinations and arrangements of the parts of the apparatus employed in the manufacture of pipe, &c., all as will be now described and pointed out particularly in the appended claim.

Referring to the accompanying drawings: Figure 1 is a vertical section through a molding apparatus constructed in accordance with my present invention. Fig. 2 is a side elevation with the outer shell and a section of pipe partially removed. Fig. 3 is a top plan of the apparatus. Fig. 4 is a detail of the ring for forming the socket; Fig. 5 an enlarged section of the same. Fig. 6 is a detail section through the bottom of one side of the mold. Figs. 7 and 8 are respectively a detail plan and elevation of one of the clamps for the outer shell.

Like letters of reference in the several figures indicate the same parts.

A indicates the core of relatively heavy cast iron, hollow and with inwardly extending flanges or lug rings at the ends to which the base plate E and top plate F are respectively bolted.

B is the shell or exterior mold preferably formed in longitudinal halves to facilitate removal from the pipe, and each half is in turn, preferably composed of two sections B, B', respectively, the former being semi-cylindrical to form the body of the pipe, and the latter B', curved to give the proper shape to the collar or socket end although, as is obvious, the two sections B, B', may be formed integral if desired.

Surrounding the core, fitting snugly thereon and resting on the base E, is an annular plate C, which I shall term the movable base plate; and on this movable base plate the outer shell is seated, preferably within a ring c which positions and holds the same against any lateral movement with relation to the core. This gives the proper shape to the exterior of the pipe and to form the socket in the flange, an independent ring D is employed, which fitting snugly around the core rests on the movable base plate within the lower section B' of the shell as shown.

The core is as before stated, integral and hollow, thus adapting it for being conveniently heated or cooled which operations may be accomplished through the medium of pipes or conductors through which heating or cooling mediums are introduced at pleasure, as shown. For instance, a pipe G opens into the core through the base for the introduction of steam and for the withdrawal of water of condensation, it only being necessary to properly manipulate the cocks I I' to put the core in communication with the waste water pipe H or the steam pipe H'. Cooling mediums such as cold brine, fluid ammonia, or any of the refrigerating compounds in common use, may be introduced through the pipes K K' passing in through the top plate and formed into a coil within the core. A coil is preferred as the circulation may be kept up through it more conveniently and effectively. The pipes K K' are provided with couplings above the top plate to permit of their disconnection when a pipe is removed and the top plate is further provided with a pressure gage M for determining the pressure within the core.

To retain the sections of the outer shell in place they are provided along each edge with a series of wedge-shape dovetail projections $p$, the projections on one section registering with those on the other, and over these projections are fitted clamps P having similar dovetail recesses $P^2$ therein and set screws $P^3$ for retaining them in place when properly seated.

In operation, the space between the core and outer shell is filled with plastic material or cement, packed as tight as possible. Then steam or heat is introduced in the core to expand the same, giving the material being molded a powerful pressing and incidentally drying the same to a certain extent, the result of which is that it is made self-sustaining. The next step is to contract the core by cutting off the steam supply, withdrawing the water of condensation and introducing a cooling medium through the pipes K K' whereby the diameter of the core is made less than that of the pipe and the pipe may then be removed with facility. To remove the newly formed pipe, the pipes K K' are immediately disconnected and the movable base plate $c$ carrying the pipe and outer casing elevated preferably by means of screws N passing through the movable base plate and resting on the base proper. When elevated to the position shown in Fig. 2 any ordinary hoisting mechanism may be brought into use and the pipe and its inclosing case deposited where desired.

For each size of pipe, a plant should have one core, one movable base plate, one socket ring and three or more outer shells or casings which are used in rotation and serve to support the pipe for some little time after being removed from the core.

The ring D it will be observed, serves to effectively support the socket end while being removed and in connection with the movable base fitting closely to the core prevents any distortion or injury to the pipe while being removed.

I am aware that it is not new in pipe making to use an inner core and an outer shell or to heat the core for the purpose of drying the pipe. Hence I do not wish to be understood as claiming these features broadly.

Having thus described my invention, what I claim as new is—

The herein described method of making refractory cement pipe, consisting in forming the pipe in a mold having a hollow core, while in a cool condition, secondly heating the core and surrounding pipe to expand the core and enlarge the internal diameter of the pipe, thirdly artifically and quickly cooling the core, thereby contracting the same and reducing its external diameter, and finally, while the pipe is still in its heated and expanded state, removing the same from the core; substantially as described.

CLEMENS SCHNELL.

Witnesses:
 EDWARD R. WEISS,
 JOHN H. WHITE.